US006801199B1

(12) United States Patent
Wallman

(10) Patent No.: US 6,801,199 B1
(45) Date of Patent: Oct. 5, 2004

(54) METHOD AND APPARATUS FOR INTERACTING WITH INVESTORS TO CREATE INVESTMENT PORTFOLIOS

(75) Inventor: Steven M. H. Wallman, Great Falls, VA (US)

(73) Assignee: FOLIOfn, Inc., Vienna, VA (US)

( * ) Notice: Subject to any disclaimer, the term of this patent is extended or adjusted under 35 U.S.C. 154(b) by 0 days.

(21) Appl. No.: 09/516,791

(22) Filed: Mar. 1, 2000

(51) Int. Cl.[7] .............................................. G06F 3/14
(52) U.S. Cl. .................... 345/440; 345/440.2; 345/764; 345/629; 345/442
(58) Field of Search ................................ 345/440, 629, 345/440.2, 764, 442, 443; 705/105, 35, 36, 38

(56) References Cited

U.S. PATENT DOCUMENTS

| | | | |
|---|---|---|---|
| 4,346,442 A | 8/1982 | Musmanno | 364/408 |
| 4,376,978 A | 3/1983 | Musmanno | 364/408 |
| 4,566,066 A | 1/1986 | Towers | 364/408 |
| 4,597,046 A | 6/1986 | Musmanno et al. | 364/408 |
| 4,642,768 A | 2/1987 | Roberts | 364/408 |
| 4,648,038 A | 3/1987 | Roberts et al. | 364/408 |
| 4,674,044 A | 6/1987 | Kalmus et al. | 364/408 |
| 4,750,121 A | 6/1988 | Halley et al. | 364/408 |
| 4,751,640 A | 6/1988 | Lucas et al. | 364/408 |
| 4,774,663 A | 9/1988 | Musmanno et al. | 364/408 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |
| 4,980,826 A | 12/1990 | Wagner | 364/408 |
| 4,989,141 A | 1/1991 | Lyons et al. | 364/408 |
| 4,994,964 A | 2/1991 | Wolfberg et al. | 364/408 |
| 5,038,284 A | 8/1991 | Kramer | 364/408 |
| 5,101,353 A | 3/1992 | Lupien et al. | 364/408 |
| 5,126,936 A | 6/1992 | Champion et al. | 364/408 |
| 5,132,899 A | 7/1992 | Fox | 364/408 |

(List continued on next page.)

FOREIGN PATENT DOCUMENTS

| | | |
|---|---|---|
| EP | WO 98/44443 | 10/1998 |
| EP | WO 98/44444 | 10/1998 |
| EP | WO 99/28845 | 6/1999 |

Primary Examiner—Kristine Kincaid
Assistant Examiner—Thomas T. Nguyen
(74) Attorney, Agent, or Firm—Kenyon & Kenyon

(57) ABSTRACT

A simple graphical user interface enables a user to understand how the user's level of risk affects both the amount of money the user can earn over a selected period and the likelihood that the user will make that amount. A graph plots return (in dollars) versus time, which may be user selectable. The user may select his preferred level of risk on a risk control panel, such as a digital risk thermometer. As the user selects various risk tolerances, the user may see the differences in how the investment may potentially grow (or potentially shrink) over the time period. When the user is comfortable with the results being displayed on the risk graph, the user may indicate to the system that the user is satisfied with the current level of the risk. This selected value of risk may be used by a portfolio manager in creating and managing the user's portfolio.

39 Claims, 7 Drawing Sheets

U.S. PATENT DOCUMENTS

| | | | | |
|---|---|---|---|---|
| 5,148,365 | A | 9/1992 | Dembo | 364/402 |
| 5,193,056 | A | 3/1993 | Boes | 364/408 |
| 5,202,827 | A | 4/1993 | Sober | 364/408 |
| 5,210,687 | A | 5/1993 | Wolfberg et al. | 364/408 |
| 5,214,579 | A | 5/1993 | Wolfberg et al. | 364/408 |
| 5,220,500 | A | 6/1993 | Baird et al. | 364/408 |
| 5,227,967 | A | 7/1993 | Bailey | 364/408 |
| 5,262,942 | A | 11/1993 | Earle | 364/408 |
| 5,270,922 | A | 12/1993 | Higgins | 364/408 |
| 5,297,032 | A | 3/1994 | Trojan et al. | 364/408 |
| 5,375,055 | A | 12/1994 | Togher et al. | 364/408 |
| 5,497,317 | A | 3/1996 | Hawkins et al. | 364/408 |
| 5,517,406 | A | 5/1996 | Harris et al. | 364/408 |
| 5,649,116 | A | 7/1997 | McCoy et al. | 395/238 |
| 5,664,115 | A | 9/1997 | Fraser | 705/37 |
| 5,671,363 | A | 9/1997 | Cristofich et al. | 395/237 |
| 5,689,650 | A | 11/1997 | McClelland et al. | 395/236 |
| 5,704,045 | A | 12/1997 | King et al. | 395/235 |
| 5,710,889 | A | 1/1998 | Clark et al. | 395/244 |
| 5,724,524 | A | 3/1998 | Hunt et al. | 395/237 |
| 5,729,700 | A | 3/1998 | Melnikoff | 395/236 |
| 5,745,706 | A | 4/1998 | Wolfberg et al. | 395/235 |
| 5,749,077 | A | 5/1998 | Campbell | 705/36 |
| 5,758,097 | A | 5/1998 | Debe et al. | 395/235 |
| 5,761,441 | A | 6/1998 | Bennett | 395/235 |
| 5,761,442 | A | 6/1998 | Barr et al. | 395/236 |
| 5,765,141 | A | 6/1998 | Spector | 705/14 |
| 5,774,881 | A | 6/1998 | Friend et al. | 705/36 |
| 5,784,696 | A | 7/1998 | Meinkoff | 705/36 |
| 5,794,219 | A | 8/1998 | Brown | 705/37 |
| 5,799,287 | A | 8/1998 | Dembo | 705/36 |
| 5,806,047 | A | 9/1998 | Hackel et al. | 705/36 |
| 5,806,049 | A | 9/1998 | Petruzzi | 705/36 |
| 5,812,987 | A | 9/1998 | Luskin et al. | 705/36 |
| 5,884,287 | A * | 3/1999 | Edesess | 705/36 |
| 5,918,218 | A | 6/1999 | Harris et al. | 705/37 |
| 5,930,774 | A | 7/1999 | Chennault | 705/36 |
| 5,946,666 | A | 8/1999 | Nevo et al. | 705/36 |
| 5,956,691 | A * | 9/1999 | Powers | 705/4 |
| 5,978,778 | A | 11/1999 | O'Shaughnessy | 705/36 |
| 5,999,918 | A * | 12/1999 | Williams et al. | 705/36 |
| 6,012,044 | A * | 1/2000 | Maggioncalda et al. | 705/36 |
| 6,360,210 | B1 * | 3/2002 | Wallman | 705/36 |
| 6,473,084 | B1 * | 10/2002 | Phillips et al. | 345/440 |

* cited by examiner

METHOD AND APPARATUS FOR INTERACTING WITH INVESTORS TO CREATE INVESTMENT PORTFOLIOS

BACKGROUND OF THE INVENTION

The present invention relates generally to methods for interacting with users of an investment portfolio manager. More particularly, the present invention relates to a method for interacting with an unsophisticated user of an investment portfolio manager that is implemented on a computer, which is coupled to a central controller via a computer network for implementing trades determined by the investment portfolio manager.

More and more people today are investing in stocks and other securities. To advise these new investors, investment managers must obtain answers from them regarding relatively sophisticated concepts of probability and risk related to investment options. When meeting in person with a new investor, an investment manager can tailor his or her presentation to match the education and experience of the individual investor. However, the costs associated with personal investment managers have led to attempts to create computer-based programs for instructing individuals as to how to structure their investments, thereby allowing investment firms to allocate resources more efficiently.

All investment advisor computer programs must interact with the individual in a way that accommodates all types of individuals with widely varying levels of education, investment experience, and computer literacy. Moreover, the computer program must do so quickly and efficiently. Users of the investment manager ("users") tend to abandon the use of computer programs that are difficult to use and are not relatively self-explanatory, causing the operator of the service being implemented via the computer program to lose potential revenue. It is especially important that the interface between the user and an Internet-based service operate intuitively and easily, because most Internet-based services, including investment services, require large numbers of satisfied users to reach profitability.

In particular, investment advisors must question the investor to determine the investor's goals and risk tolerance. These relatively esoteric concepts must be explained in a way that allows the individual to provide a quantitative answer to a relatively open question. Usually, this process involves the estimation of this quantitative value by the investment advisor based on some understanding of the investor's lifestyle, education and lifetime goals. When working with a computer program, such interactive sessions are difficult to orchestrate with predictable results in a way that users find intuitive.

Some attempts to simplify user interfaces to computer-based investment advisors have been attempted. For example, PCT patent application WO 98/44444 discloses a method and apparatus for a virtual investment advisor and support system. In FIGS. 7a through 7c of this reference, the results of an optimizer feature are shown. In a preferred embodiment of this optimizer feature, the virtual investment advisor makes use of existing analytical tools, such as modern portfolio theory, efficient portfolios, linear regression analysis, etc., to screen securities for potential inclusion in a portfolio. FIG. 7a, for example, shows as a blue bar the probable retirement income that an investor with certain specified characteristics including income, needs, savings, life expectancy, etc., would obtain by holding a portfolio of 40% government bond funds and 60% growth & income funds. The smaller graph in FIG. 7a shows expected return of the "efficient portfolios" constructed according to modem portfolio theory (those combinations of the seven investment classes that have maximum return for a given volatility risk). Return is shown on the y-axis, portfolio number on the x-axis, with the median, 70% confidence (70% chance of meeting or exceeding indicated return) over a 3-year time horizon. In the smaller chart of FIG. 7a, the vertical gold line indicates the 40/60 mixture portfolio. FIG. 7c shows a 20-year time horizon. Note that for the same portfolio, the 70% and 90% confidence curves have moved up, reflecting the notion that over a longer period an investor can reasonably accept more risk. Note that the median does not change with the time horizon. FIG. 7b shows 20 years, but the optimizer of a virtual investment advisor of the present invention has found the portfolio with the optimum 90% confidence. Note that in a preferred embodiment, the confidence-based optimizer will find different portfolios at three years based on confidence level required (each confidence level's maximum point may correspond to a different portfolio). While this system attempts to educate the user, it fails to provide a simple and effective way for the user to provide the information required to enable the computer-based investment advisor to recommend a portfolio of investments.

The present invention is therefore directed to the problem of using a computer to obtain quantitative answers to questions based on the sophisticated concepts of risk and reward from investors with a wide range of experience and sophistication.

SUMMARY OF THE INVENTION

The present invention solves the problem of using a computer to obtain quantitative answers to questions based on the sophisticated concepts of risk and reward from investors with a wide range of experience and sophistication. Embodiments of the present invention graphically explains the concepts of risk and reward and allows the user to input user preference information as an overlay on the graph. According to one embodiment, the user may interactively modify the user preference information overlay and observe the effect the user preference information has on the graph. In this embodiment, once satisfied with the user preference selection, the user may confirm his selection, which is translated to the investment management program as a quantitative reply. Each modification of the user preference information overlay may cause a recalculation of the underlying graph and a display of the revised underlying graph, thereby graphically imparting the impact of the user's selection to the user in a simple, but effective way.

According to another aspect of the present invention, the impact of the user preference information selection may be provided to the user in the form of an audible recording. In this aspect of the present invention, one form of audio recording may be used to represent higher risk/higher return selections, whereas another form of audio recording, having audio characteristics that vary from the first form of audio recording, may be used to represent lower risk/lower return selections. For example, an audio recording with a slow beat or rhythm may be used for one extreme, such as low risk/low return, and an audio recording with a faster beat or rhythm may be used for the other extreme, such as high risk/high return.

According to another aspect of the present invention, a method for obtaining a user's risk tolerance for use in creating and managing a portfolio of investments using a computer implemented portfolio management system coupled to a central controller receiving instructions to trade specific instruments to implement the user's portfolio by buying and selling said specific instruments among a plurality of other users and external third parties includes several steps. First, the method receives input from a user as to the user's preferred time horizon. Next, the method displays as a graph possible outcomes of a hypothetical investment over the user's preferred time horizon using an exemplary risk tolerance. The method also includes the step of providing a user a selectable risk tolerance control panel via which the user may modify the risk tolerance. In addition, the method updates the display of the graph of possible outcomes interactively as the user modifies the risk tolerance.

According to another aspect of the present invention, the above method includes the step of outputting a user's risk tolerance to the portfolio management system upon an indication by the user that the user is satisfied with the current setting of risk tolerance.

According to another aspect of the present invention, the above method further includes the step of displaying several outcome certainty regions in the graph. Each of the outcome certainty regions represents a section where the likelihood of actually achieving a particular result included in the section falls within a predetermined probability.

According to another aspect of the present invention, in the above method the predetermined probabilities include at least a high likelihood and a low likelihood.

According to another aspect of the present invention, in the above method the high likelihood comprises approximately 50%, and the low likelihood comprises approximately 5%.

According to yet another aspect of the present invention, a method for obtaining a user's risk tolerance for use in creating and managing a portfolio of investments using a computer implemented portfolio management system coupled to a central controller receiving instructions to trade specific instruments to implement the user's portfolio by buying and selling said specific instruments among a plurality of other users and external third parties, includes the following steps. A graph of possible outcomes of a hypothetical investment for a user selectable time period is displayed. Overlaid on the graph is a bar representing a user's risk tolerance. One axis of the graph represents a range of possible risk tolerances. Also overlaid on the graph is a line representing a risk represented by an overall market. The user is enabled to drag the bar representing the user's risk tolerance across the graph. A first portion of the graph to one side of the bar represents those possible outcomes of the hypothetical investment created using a current value of the user's risk tolerance.

According to another aspect of the present invention, in the above method a second portion of the graph to another side of the bar represents those possible outcomes of the hypothetical investment created using the current value of the user's risk tolerance that will not occur.

According to another aspect of the present invention, the above method further includes the step of shading the second portion differently than the first portion as the user moves the bar representing the user's risk tolerance.

According to another aspect of the present invention, the above method further includes the step of removing the second portion from view as the user moves the bar representing the user's risk tolerance.

According to another aspect of the present invention, the above method is modified to present returns on the Y-axis and risk on the X-axis. The risk controller is moved from a vertical device alongside the graph to a horizontal device underneath the graph.

According to another aspect of the present invention, an apparatus for obtaining a user's risk tolerance for use in creating and managing a portfolio of investments using a computer implemented portfolio management system coupled to a central controller receiving instructions to trade specific instruments to implement the user's portfolio by buying and selling said specific instruments among a plurality of other users and external third parties includes a processor, a graphical user interface and an input/output device. The processor calculates possible outcomes of a hypothetical investment over a user's selectable time horizon using a predetermined risk tolerance value and generates a graph of the possible outcomes. The graphical user interface is coupled to the processor and includes a display displaying the graph of possible outcomes of the hypothetical investment. The graphical user interface also includes an input/output device via which the user may modify the predetermined risk tolerance value, which input/output device outputs the modified risk tolerance value to the processor. The processor recalculates the possible outcomes of the hypothetical investment using the modified risk tolerance value received from the input/output device and regenerates the graph of recalculated possible outcomes. The processor then displays the graph of recalculated possible outcomes to the graphical user interface, which updates the display.

According to another aspect of the present invention, in the above apparatus the input/output device outputs the current risk tolerance value to the portfolio management system upon an indication by the user that the user is satisfied with the current setting of risk tolerance.

According to another aspect of the present invention, in the above apparatus the input/output device includes a risk tolerance control panel.

According to another aspect of the present invention, in the above apparatus the risk tolerance control panel includes a slidable bar.

According to another aspect of the present invention, in the above apparatus the risk tolerance control panel includes a risk thermometer having a plurality of selectable values of risk tolerance.

DETAILED DESCRIPTION

Embodiments of the present invention provide a simple graphical user interface that enables a user to understand how the user's level of risk affects both the amount of money the user may earn over a selected period and the likelihood that the user will make that amount. Based on that understanding, the user may derive his "risk tolerance." That is, his willingness to accept the possibility of lower returns in exchange for a possibility of higher returns. This risk tolerance can then be quantized by the investment manager and used to help the investor choose investments that match his risk tolerance. For example, an investor with a low risk tolerance might invest in government bonds which promise a fixed-rate of return and are guaranteed by the credit of a large government.

Figure 1:
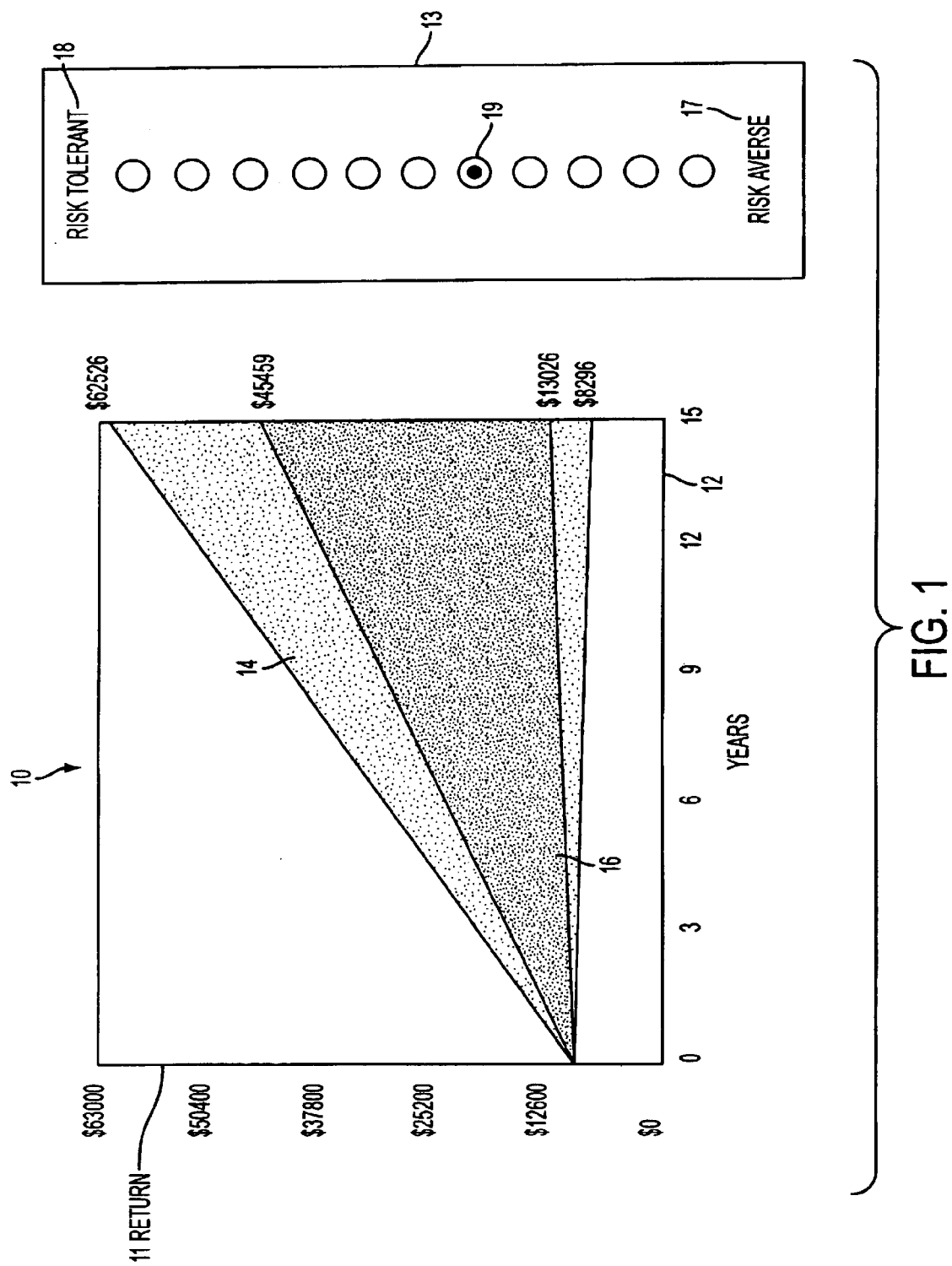
FIG. 1 depicts a graphical user interface via which a user may input user preference information to an investment manager that may be generated according to embodiments of the present invention.

FIG. 1 shows one embodiment of a user interface according to the present invention. The graph in FIG. 1 shows the potential gain or loss of $10,000 over an investment term selected by the user. In FIG. 1, graph 10 plots a range of anticipated investment outcomes (i.e., anticipated returns) 11 on the Y-axis and time 12 on the X-axis. In the example shown, the returns are shown in dollars, and the time is shown in years. In particular, the returns are delineated on the Y-axis in increments of dollars, and the time is delineated in increments of 3 years. However, the return and time may also be in other units, such as for example Euros and months, and may be delineated on each axis in other increments, such as for example every $1,000 and every month. In one embodiment, , the exact time period and amount of initial investment may be user selectable, for example, by entering the period or amount in a pull-down window. In the exemplary graph shown in FIG. 1, the time selected by the user is 15 years and the initial investment selected is $10,000.

Although graph 10 is shown in FIG. 1 as an X-Y graph, the graph may also be displayed using other types of diagrams. For example, the graph may also be displayed as a bar graph, a broken line graph, a pie chart, etc.

In the embodiment shown in FIG. 1, the user may select various risk tolerances to see the differences in how the investment may potentially grow (or potentially shrink) over the selected time period. The user may select his or her preferred level of risk using, for example, risk control panel 13, which in FIG. 1 is depicted as a digital risk thermometer. Other implementations of the risk control panel 13 are envisioned with the present invention. For example, a risk control panel may be displayed as an analog thermometer with a color indicating the change in risk from one extreme to another, such as from blue (no risk) to red (high risk). Alternatively, the "risk thermometer" could range from a dark color (e.g., black) to a light color (e.g., white) with gradually changing colors as the risk level moves from no risk to high risk, for example. A slidable bar or slider is also possible for use as the risk control panel 13 according to the present invention.

The user may then slide the risk thermometer in FIG. 1 up or down from Risk Adverse 17 to Risk Tolerant 18 and positions in-between by selecting one of the positions shown on the thermometer. When the user slides the risk thermometer up or down, they may view the results on the graph. As the user's risk tolerance increases, the lines delineating the shaded regions (i.e., the "jaws") may be opened up to show the user that while the potential reward gets larger so does the potential loss. Thus, in this version, the user's movement of the level in the risk control panel 13 modifies the underlying graph in an interactive manner enabling the user to develop an understanding of the meaning of this risk term. As a result, the risk tolerance input to the portfolio manager will more accurately represent the desires of the user. Consequently, the portfolio created by the portfolio manager will more accurately represent the investment desires of the user.

In the example shown in FIG. 1, the selected risk tolerance lies approximately in the middle of the risk tolerance thermometer 13. There may be values of risk tolerance corresponding to each position in the Risk Tolerance thermometer 13. When the user is comfortable with the results being displayed on the risk graph, the user may click on a "complete" button (not shown), which indicates to the system that the user is satisfied with the current level of the risk. In this embodiment, this clicking outputs the quantized value of the risk to the portfolio manager for use in creating and managing the user's portfolio.

In FIG. 1, the graph 10 displays the value of the investment with various levels of certainty regions. These certainty regions represent the likelihood that the actual outcome will fall in the associated region. Levels of certainty such as, for example 50%, 25%, and 5% may be displayed. In the example shown in FIG. 1, only two certainty regions are depicted for simplicity reasons. The light gray region 14 represents the 25% certainty region, whereas the dark gray region 16 represents the 50% certainty region. The most likely outcomes occur in the middle region of the graph because they fall closer to the mean value, whereas the least likely outcomes occur farther from the mean value.

At any risk tolerance level (also known as "Beta"), the user may view the possibility for achieving investment growth over the investment period. Areas such as region 16 (shaded in dark gray) represent likely targets for investment growth. Areas such as region 14 (shaded in light gray) are much less likely.

Once the user is comfortable with the potential for gain/loss, the resulting quantization of risk tolerance may be output to a portfolio management central control system for use in portfolio selection and optimization calculations, as discussed below with reference to FIG. 6.

According to another embodiment, the impact of the user preference information selection may be provided to the user in the form of an audible recording. In this embodiment, one form of audio recording may be used to represent higher risk/higher return selections. Another form of audio recording, having audio characteristics that vary from the first form of audio recording, may be used to represent lower risk/lower return selections. For example, an audio recording with a slow beat or rhythm may be used for one extreme, such as low risk/low return, and an audio recording with a faster beat or rhythm may be used for the other extreme, such as high risk/high return.

Figure 2:
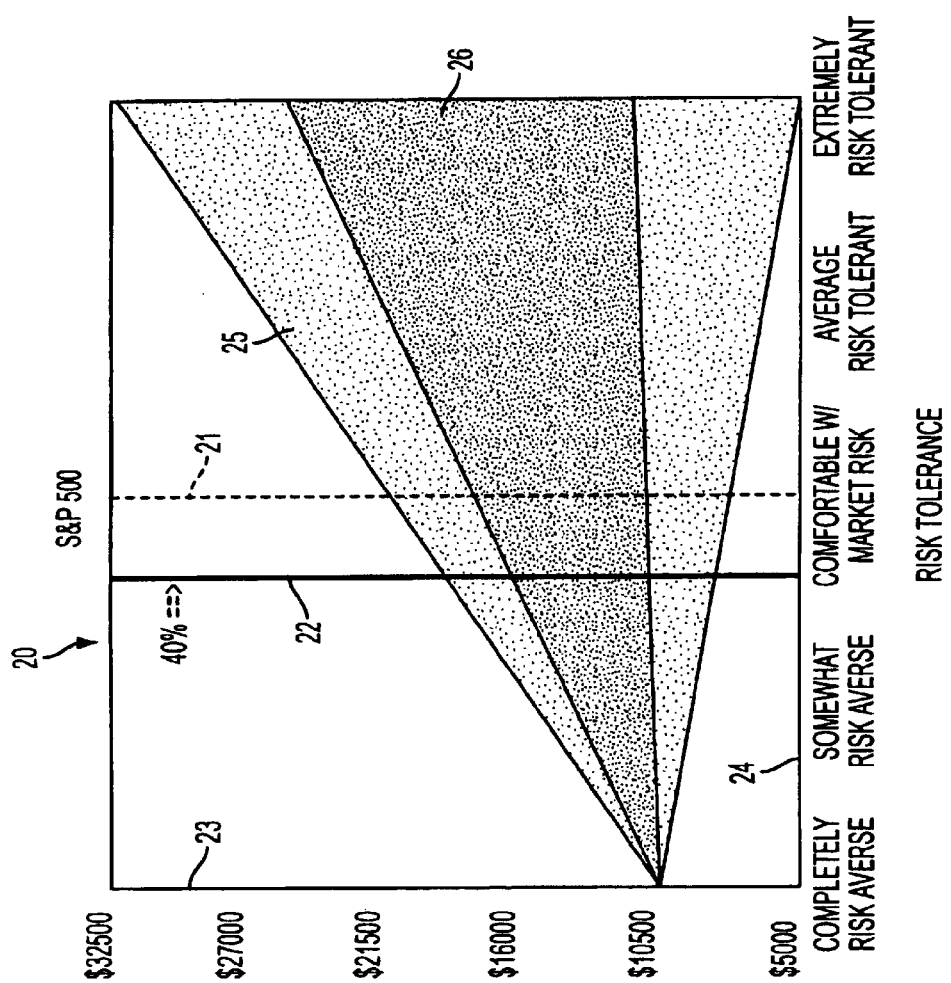
FIG. 2 depicts a graphical user interface having a risk tolerance bar and showing an entire risk/reward graph which may be generated according to embodiments of the present invention.
Figure 3:
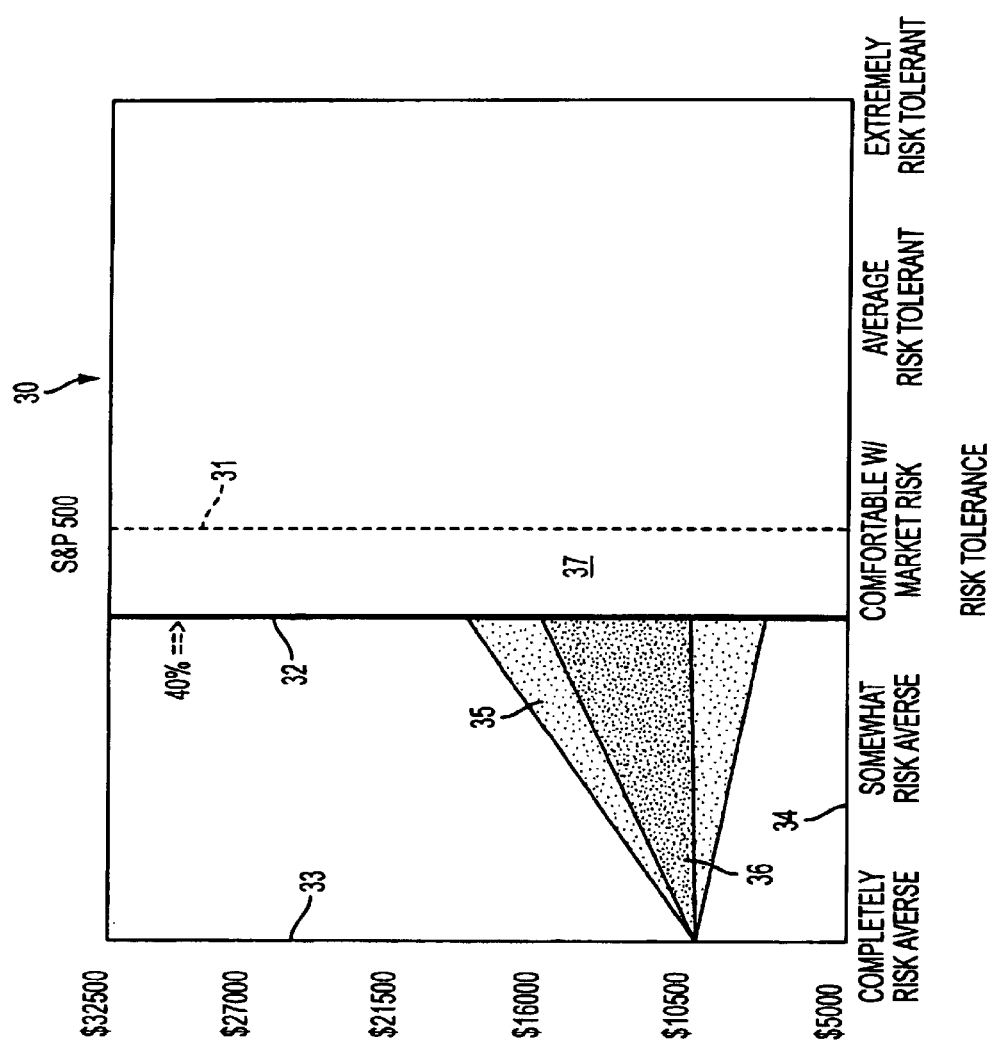
FIG. 3 depicts a graphical user interface having a risk tolerance bar and showing a portion of a risk/reward graph which may be generated according to embodiments of the present invention.
Figure 4:
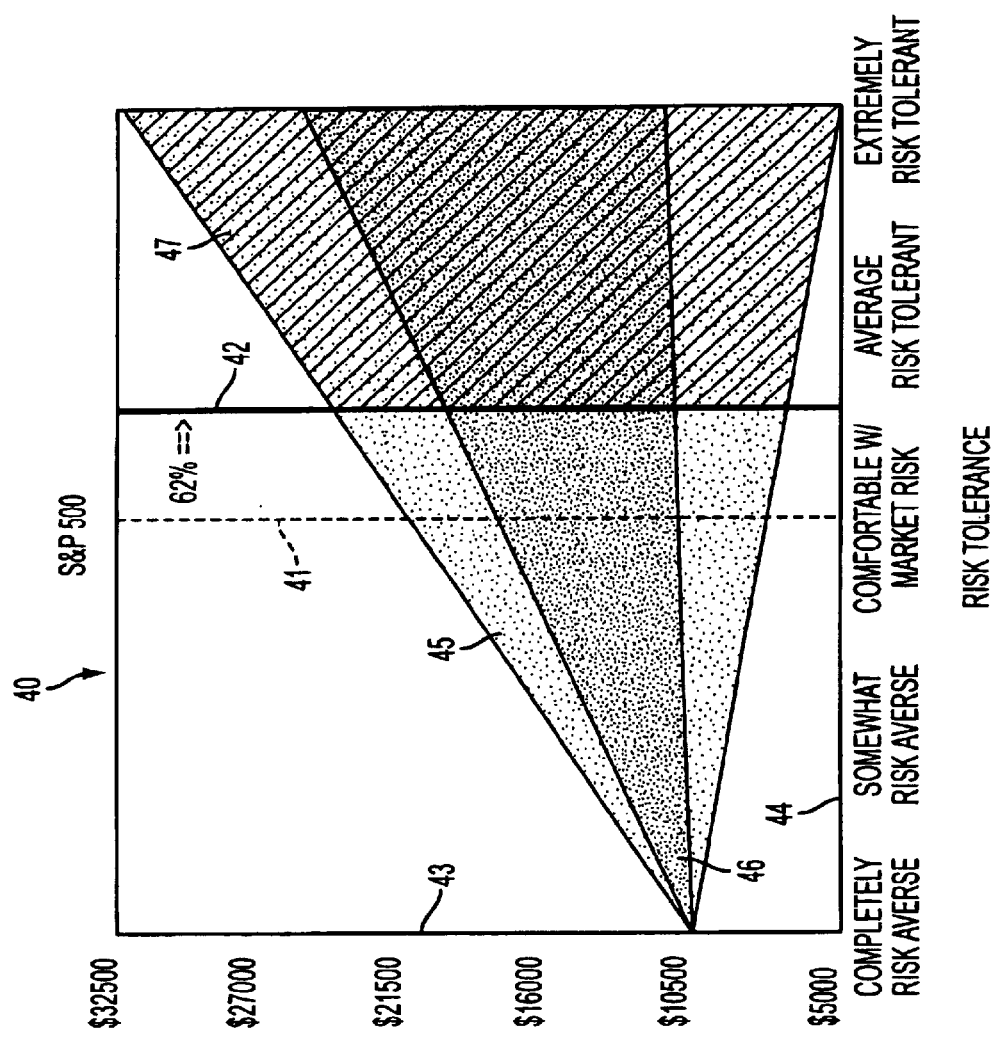
FIG. 4 depicts a graphical user interface having a risk tolerance bar and showing shading to the right of the user tolerance level which may be generated according to embodiments of the present invention.

FIGS. 2–4 show graphs 20, 30 and 40 which may be generated according to embodiments of the present invention and which depict return versus risk of a hypothetical $10,000 investment. The graphs 20, 30 and 40 show return (e.g., dollars) on the Y-axis and risk tolerance on the X-axis. The graphs represent the growth of $10,000 invested for a user selectable time period, which in these examples is five years. Other user selectable time periods are possible, such as 10 years, 15 years, 20 years, 30 years, etc. The graphs show several lines for different risk tolerance selections. By default, the S&P 500 market risk (beta=1.0) may be shown in the middle of the X-axis.

In FIGS. 2–4, a vertical line represents the associated risk bar. The user may move the associate risk bar left or right by pointing and clicking on the vertical line on the graph and draging the vertical line. The associated risk bar may be moved to indicates on the graph which part of the graph the user is most comfortable with, and therefore how much risk they are willing to take. In this way, the interactive graph enables the user to learn his or her risk preferences. Rather than simply providing an answer to a question as to how risk adverse the user is, these embodiments enable the user to understand his or her risk tolerance and provide the answer in a quantitative way to the investment manager, which requires this information to provide investment options to the user. In effect, the graph may be used to show the possible outcomes of all risk tolerances (e.g., between 0.0 and 2.0). In FIGS. 2–4, the dark gray area shows the likely return or loss of the selected period, whereas the light gray area represents the less likely return or loss during the selected period. In particular, FIG. 2 shows an embodiment of the present invention that presents an entire risk/reward graph 20 to the user as the user drags a risk tolerance bar 22. In FIG. 2, the X-axis 24 contains possible risk tolerances levels for a user, and the Y-axis 23 represents the potential value of an investment at the end of the investment period. The investment duration and amount of initial investment may be user selectable, for example, by entering the duration and amount in a pull-down window. In the exemplary graph shown in FIG. 1, the time selected by the user is 15 years and the initial investment selected is $10,000.

Examples of risk tolerance levels are: completely risk averse, somewhat risk averse, comfortable with market risk (i.e., the S&P 500 risk), above average risk tolerant, and extremely risk tolerant the region 25 may represent the less likely outcomes for a proposed investment, whereas another region 26 may represent the most likely outcomes for a proposed investment. The vertical dashed line 21 may depict the risk represented by the market, which in this embodiment is represented by the S&P 500. In other embodiments the market risk may be the Russell 2000, Dow Jones 30, etc.

In the example shown in FIG. 2, the user has moved the risk tolerance bar 22 to 40% risk. In this case, the user's quantization of risk tolerance (or beta) may be 0.8, which may be best described as somewhat less than comfortable with the level of risk associated with the S&P 500 index ("market risk."). The points where tolerance bar 22 intersect region 25 and 26 represents the anticipated investment returns for investments at that tolerance level. The area to the right or left of the bar may represent a region of the graph not applicable to the user and may be included to represent the unselected possibilities for the user. This embodiment enables the user to understand the relative nature of his or her risk tolerance selection to the remaining unselected possibilities.

FIG. 3 shows an embodiment of the present invention that presents only the applicable portion of the risk/reward graph 30 to the user when the user drags the risk tolerance bar 32. In FIG. 3, the X-axis 34 contains the risk tolerances of the user as in FIG. 2. The Y-axis 33 represents the potential value of the investment at the end of the period. The region 35 represents the less likely outcomes, whereas the region 36 represents the most likely outcomes. The risk represented by the market, which in this embodiment is represented by the S&P 500, is depicted by vertical dashed line 31.

In the example shown in FIG. 3, the user has moved the risk tolerance bar 32 to 40% risk. In this case, the user's risk tolerance (or beta) is 0.8. The area 37 to the right of the bar represents a region of the graph not applicable to the user; hence it is not drawn in. This embodiment enables the user to view only that portion of the risk/reward graph that is now applicable to the user.

FIG. 4 shows an embodiment of the present invention that presents a graph 40 with shading in the area 47 to the right of the user selected risk tolerance level 42. The X-axis 44 illustrates the risk tolerances of the user. The Y-axis 43 represents the return on the investment (growth of investment). The region 45 represents the less likely outcomes, whereas the region 46 represents the most likely outcomes. The risk represented by the market, which in this embodiment is represented by the S&P 500, is depicted by vertical dashed line 41.

In this example, the user has moved the risk tolerance bar 42 to 62% risk. In this case, the user's risk tolerance (or beta) is 1.256. The area 47 to the right of the bar represents a region of the graph not applicable to the user, hence it is shaded. This stresses that the user will not be getting the possible upside or downside of the area right of the line.

Figure 5:
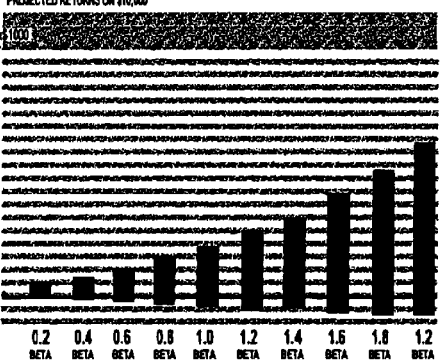
FIG. 5 depicts an alternative embodiment of a simple graphical use interface according an aspect of the present invention.

FIG. 5 shows another alternative embodiment of the present invention that provides a simple graphical user interface to enable a user to understand how the user's level of risk affects both the amount of money the user may earn over a selected period and the likelihood that the user will make that amount. Referring to FIG. 5, within the graphical user interface, a graph 50 plots return 51 (in dollars) on the Y-axis and risk 52 (in beta) on the X-axis. Moreover, the exact time period is user selectable by clicking on one of a number of alternative time periods 53, for example. In the exemplary graph shown in FIG. 5, the time selected 54 by the user is 5 years The user may then select his preferred level of risk on the risk control panel 55, which in this exemplary embodiment is depicted as a digital risk thermometer. Other implementations of the risk control panel 55 are envisioned with the present invention. For example, an analog thermometer with a color indicating the change in risk from one extreme to another, such as from blue (no risk) to red (high risk). Alternatively, the risk thermometer could range from a dark color (e.g., black) to a light color (e.g., white) with gradually changing colors as the risk level moves from no risk to high risk, for example. A slidable bar or slider is also possible for use as the risk control panel 55 according to the present invention.

As the user selects various risk tolerances the user will see the differences in how the investment -may potentially grow (or potentially shrink) over the selected time period. In the example shown in FIG. 5, the selected risk tolerance lies in the middle of the risk tolerance thermometer 55. There are values of the risk tolerance corresponding to each position in the Risk Tolerance thermometer 55. When the user is comfortable with the results being displayed on the risk graph, the user clicks on a prepare order button 56, which indicates to the system that the user is satisfied with the current level of the risk. This clicking outputs the quantized value of the risk to the portfolio manager for use in creating and managing the user's portfolio.

The graph in FIG. 5 shows the potential gain or loss of $10,000 over the investment term selected by the user. The user may increase the risk (from Risk Adverse 57 to Risk Tolerant 58) and see the results on the graph. As the user's risk tolerance increases the "jaws" (which in this embodiment are a series of bars depicting the width of the jaws) will open up showing the user that while the potential reward gets larger so does the potential loss. Thus, in this version, the user's movement of the level in the risk control panel 55 modifies the underlying graph in an interactive manner enabling the user to develop an understanding of the meaning of this risk term. As a result, the risk tolerance input to the portfolio manager will more accurately represent the desires of the user. Consequently, the portfolio created by the portfolio manager will more accurately represent the investment desires of the user.

Once the user is comfortable with the potential for gain/loss, the graphical user interface outputs the resulting quantization of risk tolerance (also known as a "beta") to the system for the portfolio selection and optimization calculations.

Figure 6:
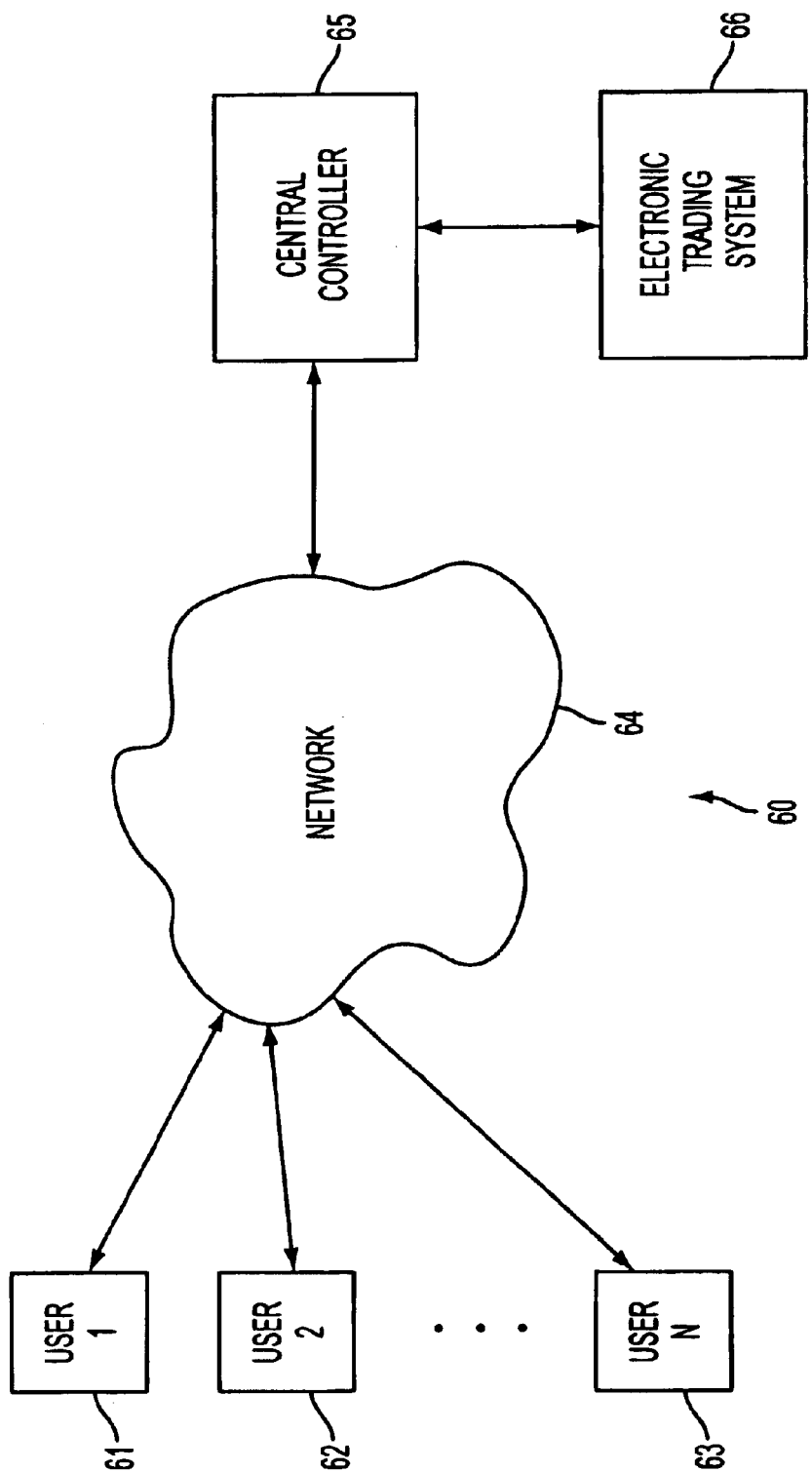
FIG. 6 is a block diagram of a a portfolio management system with which a graphical user interface may interact according to an embodiment of the present invention.
Figure 7:
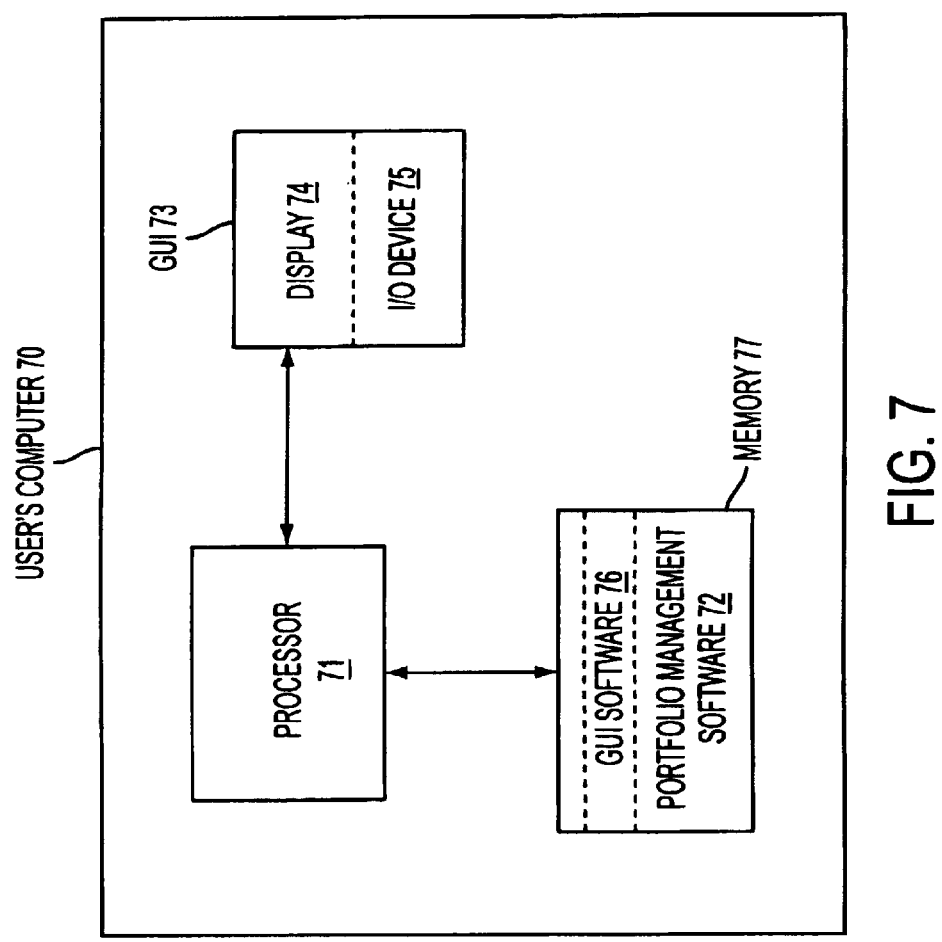
FIG. 7 is a block diagram of a user's computer on which portfolio manager software executes and with which the graphical user interface interacts according to an embodiment of the present invention.

FIG. 6 depicts a portfolio management system 60 with which the above described graphical user interface may interact. The system may include a central controller 65 accessible via a computer network 64, such as the Internet. Central controller 65 may be, for example, a network server computer. Portfolio management system software may reside on user's computer 61–63 (users 1–N), one embodiment of which is shown in FIG. 7. User computers 61–63 may be coupled to the central controller 65 via a computer network 64 such as the Internet. In this example, once the user's portfolio is established, the portfolio management system may contact the central controller 65 and send the trades necessary to implement the user's portfolio. The central controller 65 may then aggregates all of the users' trades, net those against each other where possible, and transmit a single trading order for each instrument, as necessary, to an electronic trading system 66 for execution. Upon receipt of an acknowledgment that the trades were executed, the central controller 65 may output a message to each user 61–63 whose trades were executed to inform the user of the status of the trades. In another embodiment, the portfolio management system software may reside on the central controller 65 and may be accessed by user computers 61–63 via the network 64. In this embodiment, the central controller 65 establish the users risk tolerance level and, based on this risk tolerance level, may establish the user's portfolio based.

According to one embodiment, the methods described herein may be performed by a computer. FIG. 7 is a block diagram that depicts user computer 70, which may be used in one embodiment of the present invention. The computer 70 may include a processor 71 and a memory 77 storing executable program instructions representing the methods of the foregoing embodiments. The memory 77 may be one or more of a static memory, a volatile memory and/or a non-volatile memory. The static memory conventionally may be some sort of read only memory ("ROM") provided on an electrical, magnetic or optical storage medium. The volatile memory conventionally may be some sort of random access memory ("RAM") and may be integrated as a cache within the processor or provided externally from the processor as a separate integrated circuit. The non-volatile memory also may be an electrical, magnetic or optical storage medium.

In the embodiment shown in FIG. 7, portfolio manager software 72 is stored on memory 77 Computer 72 may contain a graphical user interface 73, embodiments of which are described above. The graphical user interface 73 may include a display 74 and an input/output device 75. Graphical user interface software 76 may be stored on memory 77. Graphical user interface software may be used to drive graphical user interface 73. In another embodiment, graphical user interface software 76 may be part of portfolio management software 72. The input/output device 75 may include the risk tolerance control panel, the graphical overlay bar and an input selection device, such as a mouse, trackball, etc. (not shown). The display of a risk tolerance control panel, coupled with the input selection device and the interactive graphical display, may be used to enable the user to select a risk tolerance level and understand the concepts of risk and return as they affect his or her investment portfolio.

While the above invention has been described with reference to particular embodiments, the scope of the present invention is not limited to the disclosed embodiments. For example, while the present invention has been described above with reference to a portfolio management system, the present invention is applicable to other fields in which an understanding of risk and return are useful, including, but not limited to insurance, annuities, financial analysis, probability, etc. As another example, the information plotted on the X-axis of any of the graphs depicted may be instead plotted on the Y-axis, and vice versa.

What is claimed is:

1. A method for obtaining a user's risk tolerance comprising the steps of:
    displaying as a graph possible outcomes of a hypothetical investment for a user selectable time period calculated using an exemplary risk tolerance, the graph including one or more probability regions;
    receiving a new risk tolerance from the user;
    updating the graph interactively as the user modifies a risk tolerance control panel including:
        overlaying on the graph a bar representing a level of the user's risk tolerance, wherein one axis of the graph represents a range of possible risk tolerances,
        moving the bar representing the user's risk tolerance level across the graph based on user input,
        displaying a first portion of the graph where the one or more probability regions intersect the bar representing those possible outcomes of the hypothetical investment created using a current value of the user's risk tolerance, and
        displaying a second portion of the graph to one side of the bar having visual contrast with the first portion of the graph, and representing possible outcomes of the hypothetical investment created using the current value of the user's risk tolerance that will likely not occur; and
    outputting the user's risk tolerance to a portfolio management system upon receipt of an indication of the user's satisfaction with the current setting of risk tolerance.

2. The method according to claim 1, wherein the graph contains a plurality of outcome certainty regions, and wherein each of the outcome certainty regions represents possible outcomes that have a likelihood of being achieved within a predetermined probability.

3. The method according to claim 2, wherein the predetermined probabilities include at least a high likelihood and a low likelihood.

4. The method according to claim 3, wherein the high likelihood comprises approximately 50%, and the low likelihood comprises approximately 5%.

5. The method according to claim 1, wherein the risk tolerance is received from the user using the risk tolerance control panel comprising a risk thermometer.

6. The method according to claim 1, wherein the risk tolerance is received from the user using the risk tolerance control panel comprising a slidable bar.

7. The method according to claim 1, wherein the graph contains possible outcomes of a hypothetical investment over the user's preferred time horizon using an exemplary risk tolerance.

8. The method according to claim 1, wherein the method further comprises receiving a preferred time horizon from the user, and wherein the graph uses the preferred time horizon.

9. A method for obtaining a user's risk tolerance comprising the steps of:
- displaying a graph of possible outcomes of a hypothetical investment for a user selectable time period using an exemplary risk tolerance, the graph containing one or more probability regions;
- overlaying on the graph a bar representing the user's risk tolerance, wherein one axis of the graph represents a range of possible risk tolerances;
- moving the bar representing the user's risk tolerance across the graph based on user input;
- displaying a first portion of the graph where the one or more probability regions intersect the bar representing those possible outcomes of the hypothetical investment created using a current value of the user's risk tolerance;
- displaying a second portion of the graph to one side of the bar having visual contrast with the first portion of the graph representing possible outcomes of the hypothetical investment created using the current value of the user's risk tolerance that will likely not occur; and
- outputting the user's risk tolerance to a portfolio management system upon receipt of an indication of the user's satisfaction with the current setting of risk tolerance.

10. The method of claim 9, further comprising overlaying on the graph a line representing a risk represented by an overall market.

11. The method according to claim 9, wherein the visual contrast of the second portion of the graph with the first portion of the graph is reflected by shading the second portion as the user moves the bar representing the user's risk tolerance.

12. The method according to a claim 9, wherein the visual contrast of the second portion of the graph with the first portion of the graph is reflected by erasing the second portion as the user moves the bar representing the user's risk tolerance.

13. The method according to claim 9, wherein the graph contains a plurality of outcome certainty regions, and wherein each of the outcome certainty regions represents possible outcomes that have a likelihood of being achieved within a predetermined probability.

14. The method according to claim 13, wherein the predetermined probabilities include at least a high likelihood and a low likelihood.

15. The method according to claim 14, wherein the high likelihood comprises approximately 50%, and the low likelihood comprises approximately 5%.

16. The method according to claim 9, wherein the risk tolerance is received from the user using a risk tolerance control panel including a risk thermometer.

17. The method according to claim 9, wherein the risk tolerance is received from the user using a risk tolerance control panel including a slidable bar.

18. An apparatus for obtaining a user's risk tolerance comprising:
a) a processor for calculating possible outcomes of a hypothetical investment over a user's selectable time horizon using a predetermined risk tolerance value and generating a graph of the possible outcomes, the graph including one or more probability regions; and
b) a graphical user interface coupled to the processor including:
(i) a display through which the processor overlays on the graph a bar representing a user's predetermined risk tolerance value, wherein one axis of the graph represents a range of possible risk tolerance values, and moves the bar representing the user's risk tolerance value across the graph based on user input, and displays a first portion of the graph where the one or more probability regions intersect the bar representing those possible outcomes of the hypothetical investment created using a current value of the user's risk tolerance, and displays a second portion of the graph to one side of the bar having visual contrast with the first portion of the graph, representing possible outcomes of the hypothetical investment created using the current value of the user's risk tolerance that will likely not occur; and
(ii) an input/output device for modifying the predetermined risk tolerance value, wherein the input/output device outputs the modified risk tolerance value to the processor, wherein the processor recalculates the possible outcomes of the hypothetical investment using the modified risk tolerance value and regenerates the graph of recalculated possible outcomes and provides said graph of recalculated possible outcomes to the graphical user interface for use in updating the display, wherein the input/output device outputs the current risk tolerance value to a portfolio management system upon an indication by the user that the user is satisfied with the current setting of risk tolerance.

19. The apparatus according to claim 18, wherein the input/output device includes a risk tolerance control panel.

20. The apparatus according to claim 19, wherein the risk tolerance control panel includes an adjustable bar.

21. The apparatus according to claim 19, wherein the risk tolerance control panel includes a risk thermometer having a plurality of selectable values of risk tolerance.

22. A method of obtaining a satisfactory risk tolerance level for a user, comprising:
- displaying as a graph a range of predicted investment outcomes for a user selectable time period calculated using a risk tolerance level, the graph including one or more probability regions;
- interactively modifying the graph to reflect new risk tolerance levels provided by a user including
  - overlaying on the graph a bar representing a user's risk tolerance level, wherein one axis of the graph represents a range of possible risk tolerance levels,
  - moving the bar representing the user's risk tolerance level across the graph based on user input,
  - displaying a first portion of the graph where the one or more probability regions intersect the bar representing those possible outcomes of the hypothetical investment created using a current level of the user's risk tolerance, and
  - displaying a second portion of the graph to one side of the bar having visual contrast with the first portion of the graph, representing possible outcomes of the hypothetical investment created using the current level of the user's risk tolerance that will likely not occur;
- receiving an indication from the user that the risk tolerance level reflected in the graph is satisfactory; and outputting the user's risk tolerance to a portfolio management system.

23. The method of claim 22, wherein the graph contains a plurality of outcome certainty regions that each represent an investment outcome range the likelihood which is within a predetermined probability.

24. The method of claim 23, wherein the predetermined probabilities include at least a high likelihood and a low likelihood.

25. The method of claim 23, wherein the predetermined probabilities include at least a probability of approximately 50% and a probability of approximately 5%.

26. The method of claim 22, wherein the method further comprises receiving a time horizon from the user; and wherein the graph uses the time horizon.

27. The method of claim 22, wherein the risk tolerance level is received from the user using a risk tolerance control panel.

28. The method of claim 27, wherein the risk tolerance control panel includes a slidable bar.

29. The method of claim 22, wherein the graph has investment return on a first axis and investment duration on a second axis, wherein the predicted investment outcome is represented as one or more regions, and where the size of the one or more regions increases as the level of risk is increased by the user.

30. The method of claim 22, further comprising generating sounds having characteristics that vary according to the level of risk provided by the user.

31. A method of creating an investment portfolio, comprising:
displaying a graph representing predicted investment outcomes using a risk tolerance level, the graph including one or more probability regions;
interactively modifying the graph to reflect new risk tolerance levels provided by a user including
overlaying on the graph a bar representing a user's risk tolerance level, wherein one axis of the graph represents a range of possible risk tolerance levels,
moving the bar representing the user's risk tolerance level across the graph based on user input,
displaying a first portion of the graph where the one or more probability regions intersect the bar representing those possible outcomes of the hypothetical investment created using a current level of the user's risk tolerance, and
displaying a second portion of the graph to one side of the bar having visual contrast with the first portion of the graph, representing possible outcomes of the hypothetical investment created using the current level of the user's risk tolerance that will likely not occur;
receiving an indication from the user that the risk tolerance level reflected is satisfactory;
outputting the user's risk tolerance to a portfolio management system; and
creating an investment portfolio based on the reflected risk tolerance level.

32. The method of claim 31, wherein the graph is a bar graph, and wherein the risk tolerance level received is based on the user selecting a risk tolerance level corresponding to one of the bars in the graph.

33. The method of claim 32, wherein the user selects an investment duration, and wherein the graph uses the selected investment duration.

34. An article of manufacture comprising a computer-readable medium having stored thereon instructions adapted to be executed by a processor, the instructions which, when executed, cause the processor to schedule an operation by:
displaying as a graph a range of predicted investment outcomes for a user selectable time period calculated using a risk tolerance level, the graph including one or more probability regions;
interactively modifying the graph to reflect new risk tolerance levels provided by a user including
overlaying on the graph a bar representing a user's risk tolerance level, wherein one axis of the graph represents a range of possible risk tolerance levels,
moving the bar representing the user's risk tolerance level across the graph based on user input,
displaying a first portion of the graph where the one or more probability regions intersect the bar representing those possible outcomes of the hypothetical investment created using a current level of the user's risk tolerance, and
displaying a second portion of the graph to one side of the bar, in visual contrast with the first portion of the graph, representing possible outcomes of the hypothetical investment created using the current level of the user's risk tolerance that will likely not occur;
receiving an indication from the user that the risk tolerance level reflected in the graph is satisfactory;
outputting the user's risk tolerance to a portfolio management system.

35. The article of manufacture of claim 34, wherein the graph contains a plurality of outcome certainty regions that each represent an investment outcome range the likelihood which is within a predetermined probability.

36. The article of manufacture of claim 34, wherein the predetermined include at least a high likelihood and a low likelihood.

37. The article of manufacture of claim 34, wherein the predetermined include at least a probability of approximately 50% and a probability of approximately 5%.

38. The method of claim 22, wherein the graph has investment return on a first axis and risk level on a second axis, and wherein the user provides new risk tolerance level by moving a bar along the second axis.

39. The method of claim 38, wherein the graph only contains investment outcomes applicable for the level or risk selected by the user.

* * * * *